United States Patent [19]

Dunchock

[11] Patent Number: 5,131,036
[45] Date of Patent: Jul. 14, 1992

[54] TELEPHONE SUPPORTING DEVICE

[76] Inventor: Richard Dunchock, 535 S. Coast Hwy., Unit 59, Laguna Beach, Calif. 92651

[21] Appl. No.: 724,586
[22] Filed: Jul. 1, 1991
[51] Int. Cl.5 .......................... H04M 1/00; B60R 7/00
[52] U.S. Cl. ...................... 379/446; 379/454; 379/455; 224/42.42; 224/42.45 R
[58] Field of Search ............... 379/454, 446, 447, 449, 379/450, 455, 457; 224/273, 42.42, 42.45 R, 42.43, 42.44; 248/309.1, 222.2, 231.8, 214, 301; 381/86, 87

[56] References Cited

U.S. PATENT DOCUMENTS

| 2,522,477 | 9/1950 | Wexberg et al. | 224/42.45 R |
|---|---|---|---|
| 3,344,236 | 9/1967 | Chipping . | |
| 4,061,971 | 12/1977 | Barrons . | |
| 4,196,319 | 4/1980 | Gates . | |
| 4,611,734 | 9/1986 | Luecking et al. . | |
| 4,640,542 | 2/1987 | Watjer et al. . | |
| 4,842,174 | 6/1989 | Sheppard et al. . | |
| 4,858,796 | 8/1989 | Roth | 224/42.44 |
| 4,945,561 | 7/1990 | Rioux, Jr. | 379/454 |
| 5,048,083 | 9/1991 | Dunchock . | |

FOREIGN PATENT DOCUMENTS 2581605 11/1986 France .

Primary Examiner—James L. Dwyer
Assistant Examiner—Jack Chiang
Attorney, Agent, or Firm—Stetina and Brunda

[57] ABSTRACT

A telephone supporting device is disclose which is detachably mountable to an automobile center console. The device comprises a coupling member adhesively secured to the console and a housing sized and configured to be secured upon the console in detachable engagement with the coupling member.

10 Claims, 2 Drawing Sheets

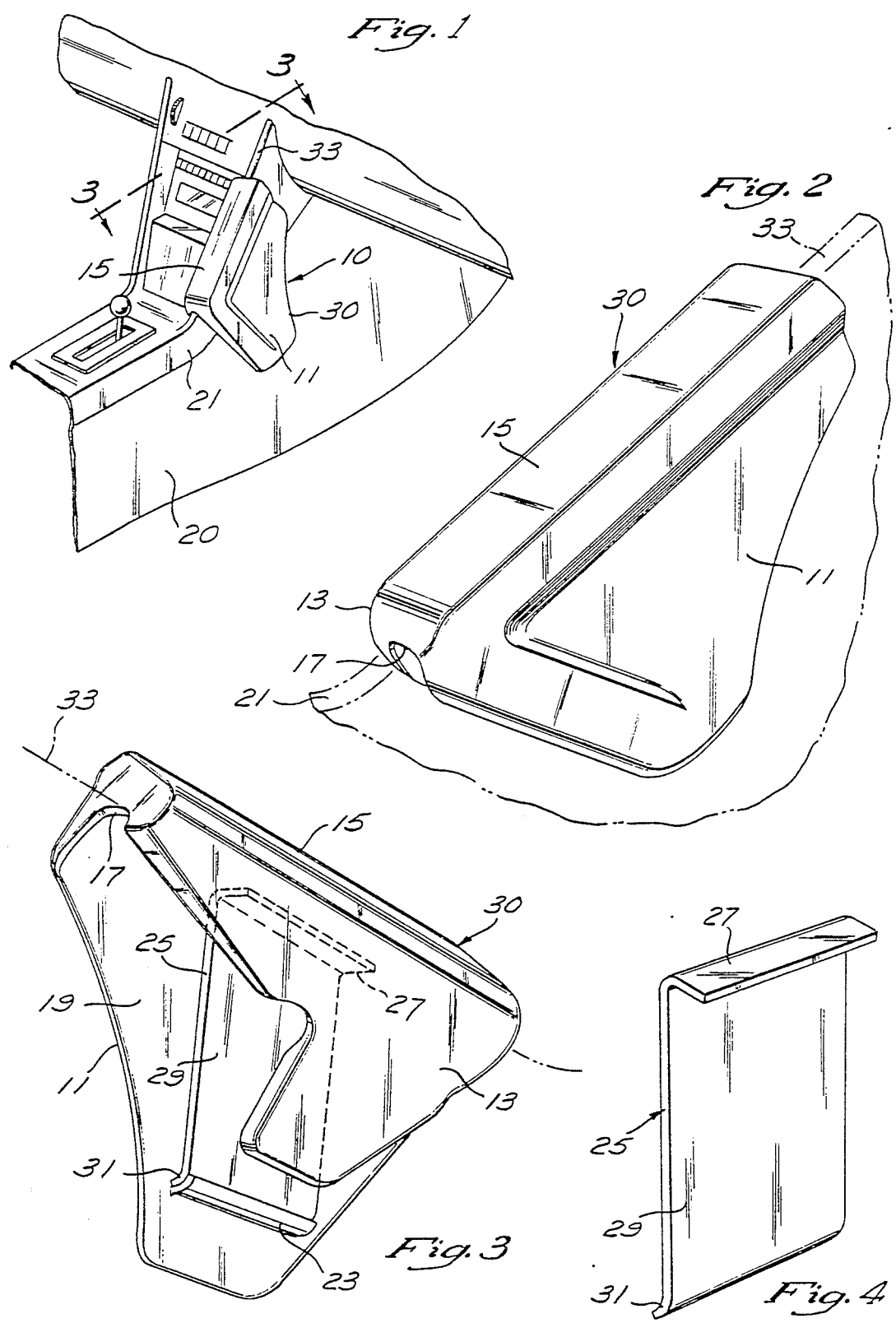

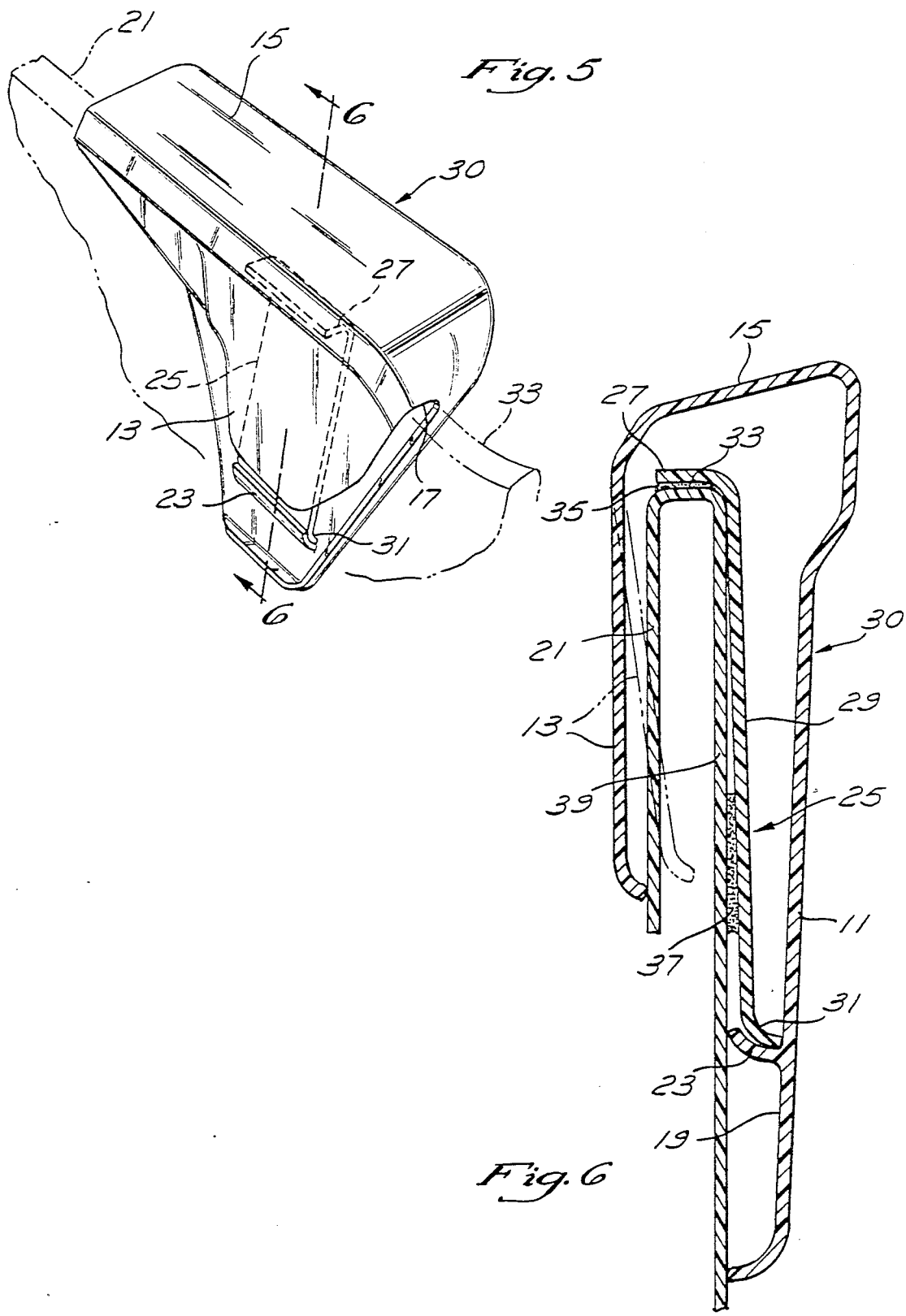

TELEPHONE SUPPORTING DEVICE

FIELD OF THE INVENTION

The present invention pertains generally to the art of automotive accessories, and more particularly to a device for mounting cellular telephones and similar accessories adjacent to the center console (i.e., an elongate console positioned between the two front seats) of an automobile.

BACKGROUND OF THE INVENTION

It has heretofore been a common practice in the art to mount cellular telephones and similar automotive accessories directly on accessible areas of an automobile instrument panel and/or a center console (i.e. the console positioned between the driver's seat and the front passenger seat of the automobile). Recent trends in automotive designs have, however, resulted in a diminution of available mounting space for cellular telephones and available accessories.

In efforts to create more space for mounting telephones and/or other accessories, some installers have used mounting brackets for attaching telephone and/or other accessories to the side of the automobile center console. Such mounting brackets are typically attached to the center console by way of screws or bolts. Thus, if it is subsequently desired to remove the telephone or other accessory, extraction of the screws or bolts leaves unsightly holes in visible portions of the center console.

The Applicant has previously disclosed a devise for mounting cellular telephones adjacent to the center console without the need to insert screws or bolts into the console. In Applicant's prior invention, disclosed in U.S. patent application Ser. No. 07/470,723, filed Jan. 26, 1990, "Automotive Telephone Mounting Device" Applicant has disclosed a device that retractably engages the finished portion of the console without requiring unsightly holes in visible portions of the console. The device is secured to the console by means of screws extending through the underlying center hump through the carpet. Thus, removal of the telephone supporting device does not result in any unsightly holes in the finished portion of the console, leaving only a hole in the floorboard hump which is typically unobservable through the carpet nap.

Accordingly, Applicant's prior device satisfies the need for a telephone supporting device which can be removed without leaving any visible damage in the center console. However, many car owners prefer that the telephone supporting device be removable without leaving any screw holes, even in the underlying floorboard hump. Applicant's present invention is designed to provide such a device which can be secured and removed without the need for any screws or bolts whatsoever, while being effective to securely engage the telephone supporting device to the center console.

SUMMARY OF THE INVENTION

A telephone supporting device is disclose which is detachably mountable to an automobile center console. The device comprises a coupling member adhesively secured to the console and a housing sized and configured to be secured upon the console in detachable engagement with the coupling member.

In the preferred embodiment the coupling member has an upper flange formed to abut against the console raised edge portion. The coupling member is also provided with a body portion, extending substantially perpendicular to the upper portion, adjacent the console exterior side portion. The coupling member further includes a lower flange extending away from the console exterior side portion.

The housing is preferably sized and configured to mount upon the console raised edge portion. Additionally, the housing preferably includes a lip formed on an inner surface thereof for detachable engagement to the coupling member lower flange. The telephone may be secured to an upper surface of the housing. The housing is typically provided with sidewall portions extending downwardly about the console edge portion. A channel is formed intermediate the first and second vertical portions for receiving the console edge portion. The housing sidewall portions are normally biased towards each other to oppose lateral movement of the housing. The engagement of the housing lip to the coupling member lower flange further opposes vertical movement of the housing with respect to the console.

BRIEF DESCRIPTION OF THE DRAWINGS

FIG. 1 is a perspective view of an automobile center console illustrating the telephone supporting device thereon;

FIG. 2 is a front perspective view of an automotive telephone supporting device formed in accordance with the present invention;

FIG. 3 is a rear perspective view of the device shown at FIG. 2;

FIG. 4 is a perspective view of a coupling member useful in securing the telephone supporting device to the center console.

FIG. 5 is a perspective view showing the telephone supporting device mounted on the console edge portion; and FIG. 6 is a sectional view of the telephone supporting device shown at FIG. 5.

DETAILED DESCRIPTION OF THE PRESENTLY PREFERRED EMBODIMENT

The detailed description set forth below in connection with the appended drawings is intended merely as a description of the presently preferred embodiments of the invention, and is not intended to represent the only form in which the present invention may be constructed or utilized. The description sets forth the functions and sequence of steps for construction and implementation of the invention in connection with the illustrated embodiments. It is to be understood, however, that the same or equivalent functions and sequences may be accomplished by different embodiments that are also intended to be encompassed within the spirit and scope of the invention.

FIG. 1 is a perspective view of an automobile center console illustrating a telephone supporting device mounted thereon. As shown at FIG. 1 telephone supporting device 10 is secured to edge portion 21 which has a top surface, an interior and an exterior side portions, as shown in FIG. 6, of automobile console 20. It will be understood by those skilled in the art that a precise configuration and orientation of the device 10 will vary in accordance with the size and shape of the console to which it is to be mounted. For example, the edge portion 21 of the console 20 may be formed at different angles or have differing vertical clearance in relation to the flat portions of the console. Thus, the length and shape of the telephone supporting device 10 will vary in order to accommodate the available clearances and configuration of the console edge portions.

FIG. 2 is a front perspective view of the housing 30 of the telephone supporting device 10 shown at FIG. 1. As shown at FIG. 2 the housing 30 includes an exterior side portion 11, an interior side portion 13 and an upper surface 15 for supporting a telephone (not shown). A channel 17 is formed intermediate the vertical side portions 11 and 13 for receiving the console upper edge portion 21 (see FIG. 1). Side portions 11 and 13 are normally biased towards each other to oppose lateral movement of the telephone supporting device 10 with respect to the console 20. It should also be understood that the size and shape of channel 17 is formed in accordance with the particular size and shape of the console edge portion 21, to further oppose lateral motion of the telephone mounting device 10 with respect to the console.

FIG. 3 is a rear perspective view of the housing 30 at FIG. 2. FIG. 3 further illustrates the inner surface 19 of exterior side portion 11. As shown therein a lip 23 is formed on the inner surface 19 for detachable engagement to the coupling member 25, as described more fully below. The coupling member 25 is preferably secured to the console edge portion 21 by means of an adhesive. The housing 30 is secured to the console by means of both engagement of the console edge portion 21 within housing channel 17, and by engagement of coupling member 25 to lip 23. The present invention therefore avoids the need for any screws or other destructive fasteners to secure the housing 30 to the center console 20.

FIG. 4 further illustrates the coupling member 25 shown at FIG. 3. As shown at FIG. 4 the coupling member 25 includes an upper flange 27, a body portion 29 and a lower flange 31. As will be further understood by those of ordinary skill in the art the particular size and shape of the coupling member 25 is selected in accordance with the particular configuration of the console on which the telephone supporting device is to be mounted.

FIG. 5 is a perspective view showing the telephone supporting device mounted to a console edge portion. As shown therein the upper flange portion 27 of coupling member 25 rests upon the top surface 33 of console edge portion 21. As shown at FIG. 6 layer of adhesive secures the coupling member 25 to the console edge portion 21. In the presently preferred embodiment the adhesive layer is formed in two portions. The first adhesive layer portion 35 extends intermediate the top surface portion 33 and upper flange portion 27. The second adhesive portion 37 extends intermediate the body portion 29 and the vertical wall (console exterior side portion) 39 of console edge portion 21. The adhesive layers 35 and 37 may be implemented as double sided tape secured to the console edge portion 21 at the desired location(s). The tape may be readily removed from the console edge portion without damaging the console in any permanent manner.

In practice the telephone supporting device 10 is mounted to the console by first applying a layer of tape to the coupling member 25 on console edge portion 21 to secure the coupling member 25 to the console edge portion 21. The housing 30 is thereafter biased open to fit about the console edge portion 21 and to permit the housing lip 23 to engage the coupling member lower flange 31. To remove the telephone supporting device the housing exterior wall 11 is flexed outwardly to permit disengagement between the lip 23 and lower flange 31. The housing may thereafter be elevated to disengage the housing 30 from the console edge portion 21. Thereafter the coupling member 25 may be separated from the console edge portion 21 any remaining adhesive removed from the surface of console edge portion 21 by means of an appropriate detergent or solvent.

What is claimed is:

1. A telephone supporting device detachably mounted to an automobile center console edge portion having a console top surface portion, a console exterior side portion and a console interior side portion, the device comprising:

a coupling member adhesively secured to the console, said coupling member having an upper flange, a lower flange and a body portion, said body portion extending between the upper and lower flanges; said upper flange formed to abut against the console top surface portion, said body portion extending substantially downwardly along the console exterior side portion, and said lower flange extending outwardly from the console exterior side portion; and a housing for supporting a telephone, the housing being sized and configured for mounting upon the console top surface portion, and for supporting a telephone thereon, said housing including a lip formed on an inner surface thereof for detachable engagement with the coupling member lower flange to secure the housing in place upon the console.

2. The telephone supporting device as recited in claim 1 wherein said housing includes a housing upper surface for supporting a telephone thereon, a housing exterior side portion extending downwardly along the console side portion and an interior side portion extending downwardly along the console interior side portion.

3. The telephone supporting device as recited in claim 2 wherein said lip is formed along an inner surface of said housing exterior side portion.

4. The telephone supporting device as recited in claim 2 wherein said housing interior and exterior side portions are normally biased toward each other, and extend about the console edge portion.

5. The telephone supporting device as recited in claim 2 wherein said housing further comprises a channel intermediate the housing interior and exterior side portions for receiving the console top surface portion.

6. The telephone supporting device as recited in claim 1 wherein said lip is an integral portion of the housing exterior side portion.

7. The telephone supporting device as recited in claim 1 wherein said lip is formed proximate a lower edge of the housing exterior side portion.

8. The telephone supporting device as recited in claim 1 further comprising a layer of adhesive disposed upon the coupling member upper flange for holding the coupling member in place against the console top surface portion.

9. The telephone supporting device as recited in claim 1 further comprising a layer of adhesive disposed upon the coupling member body portion for holding the coupling member in place against the console top surface portion.

10. The telephone supporting device as recited in claim 8 wherein the layer of adhesive comprises double sided adhesive material having a first side secured to the coupling member and a second side engageable to the console edge portion.

* * * * *